United States Patent [19]

Lahoda et al.

[11] Patent Number: 5,268,128
[45] Date of Patent: Dec. 7, 1993

[54] METHOD AND APPARATUS FOR CLEANING CONTAMINATED PARTICULATE MATERIAL

[75] Inventors: Edward J. Lahoda, Edgewood Borough; David C. Grant, Gibsonia, both of Pa.

[73] Assignee: Westinghouse Electric Corp., Pittsburgh, Pa.

[21] Appl. No.: 648,673

[22] Filed: Jan. 31, 1991

Related U.S. Application Data

[63] Continuation-in-part of Ser. No. 529,092, May 25, 1990, Pat. No. 5,128,068.

[51] Int. Cl.$^5$ .......................... G21F 9/00; B03B 5/28
[52] U.S. Cl. ....................................... 252/626; 209/2; 209/18; 209/456; 209/457
[58] Field of Search ...................... 252/626; 209/2, 18, 209/456, 457

[56] References Cited

U.S. PATENT DOCUMENTS

| | | | |
|---|---|---|---|
| 414,103 | 10/1889 | Wunder | 209/2 |
| 1,097,855 | 5/1914 | Freygang | 209/2 |
| 1,376,459 | 5/1921 | Pedersen | 209/2 |
| 1,458,234 | 11/1922 | Miller | 209/2 |
| 3,097,159 | 5/1958 | Ofner | 209/425 |
| 3,998,751 | 12/1976 | Murray | 252/187 H |
| 4,056,464 | 11/1977 | Kelly | 209/589 |
| 4,167,973 | 9/1979 | Forte et al. | 166/267 |
| 4,234,448 | 11/1980 | Alrano et al. | 252/301.1 |
| 4,293,438 | 10/1981 | Le Bebrink et al. | 252/301.1 |
| 4,310,413 | 1/1982 | Cleaueland | 209/456 |
| 4,342,654 | 8/1982 | Lambert | 210/744 |
| 4,423,008 | 12/1980 | Yan | 423/7 |
| 4,614,579 | 9/1986 | Dorph | 209/18 |
| 4,737,315 | 4/1988 | Suzuki et al. | 252/632 |
| 4,741,866 | 5/1988 | Grantham et al. | 252/632 |
| 4,755,332 | 7/1988 | Mizuno et al. | 264/0.5 |
| 4,772,384 | 9/1988 | Schönprt et al. | 209/425 |
| 4,783,253 | 11/1988 | Ayres et al. | 209/2 |
| 4,783,263 | 11/1988 | Trost et al. | 210/638 |
| 4,842,998 | 6/1989 | Bruya | 134/10 |
| 4,882,094 | 11/1989 | Rubin et al. | 252/633 |
| 5,128,068 | 7/1992 | Lahoda et al. | 252/626 |

OTHER PUBLICATIONS

Assink, J. W., *Contaminated Soil*, pp. 655-667, 1986.
Werther, et al., *Contaminated Soil*, pp. 887-889, 1986.
McDermott, et al., "Two Strategies for PCB Soil Remediation: Biodegradation and Surfactant Extraction," General Electric Co., Corporate Research and Development.
Hallett, D. J., "Thermal Gas Phase Reduction of Organic Hazardous Wastes in Aqueous Matrices," pp. 1-9, May 1990.
Barich, J. T., "Ultraviolet Radiation/Oxidation of Organic Contaminants in Ground, Waste and Drinking Waters," pp. 1-12, May 1990.
Wessling, Dr. E., "Cleanup of Contaminated Soil by Ozone Treatment," pp. 1-5.
ACE Separator Brochure, Electro-Pure Systems, Inc.
DIKLOR-S Brochure, EXXON Chemical Company.
Wiley, "Finding Treatment Options for Inorganics," *Water/Engineering & Management*, Oct. 1987, pp. 28-31.
Canter, et al., "Ground Water Pollution Control," Lewis Publishers, Inc., 1985, pp. 110-120.

*Primary Examiner*—Donald P. Walsh
*Assistant Examiner*—Daniel Jenkins

[57] ABSTRACT

Particulate material is treated by first washing the contaminated material with a contaminant mobilizing solution comprising a leaching agent, a surfactant or a mixture thereof. Large particles, typically greater than 5 mm are mechanically separated, washed with water and returned to the site as recovered soil. Fines, along with contaminants dissolved or dispersed in the contaminant mobilizing solution are separated from intermediate sized particles by a countercurrent flow of the contaminant mobilizing solution, preferably in a mineral jig. The intermediate sized particles are then abraded in an attrition scrubber to dislodge attached mineral slimes or fines. These additional fines are separated from the intermediate sized particles with a countercurrent flow of wash water in a second mineral jig. The preferred oxidizing agent is chlorine, and hydrogen is the preferred reducing agent.

35 Claims, 7 Drawing Sheets

METHOD AND APPARATUS FOR CLEANING CONTAMINATED PARTICULATE MATERIAL

This is a continuation-in-part of U.S. Pat. No. 5,128,068, which issued on Jul. 7, 1992 from U.S. patent application Ser. No. 529,092, filed May 25, 1990.

BACKGROUND OF THE INVENTION

1. Field of the Invention

This invention relates to a method and apparatus for cleaning particulate materials such as soils which are contaminated with a variety of contaminants such as heavy metals, radioactive compounds and organics, often in combination, through a combination of leaching, washing, attrition scrubbing, countercurrent flow size separation and density separation. This invention further relates to the recovery of such contaminants following removal from the soils, for additional processing, recycling or disposal.

2. Background Information

Contaminated soil is becoming a more common environmental problem. The contaminants can include heavy metals, such as for instance, copper, lead and mercury; radioactive species such as for example, radium, uranium and thorium; and organics such as for example, oils, polychlorinated biphenyls, flue soot and others. Various techniques have been developed to remove specific contaminants. For instance, heavy metals are known to be found predominantly in the silt, humic or clay fraction of soil. Hence, they can be removed by size separation such as tiltable tables, concurrent flow in a mineral jig and chemical techniques such as the use of precipitants. The radioactive compounds when originating as a spill can be removed to a large extent by leaching. Since these compounds are often also present in the finer particles, the most severely contaminated fraction can also be removed by countercurrent flow size separation. Organics can be removed by washing with surfactants, thermal treatment or biological processes.

Special problems develop when the different types of contaminants are present in soil. Generally, biological or thermal processes are more effective for removing organics than washing. However, toxic inorganics such as lead or chromium (+6), if present, deactivate biological systems due to their toxicity and cause air pollution problems for thermal processes. In addition, thermal processes may mobilize otherwise fixed contaminants in the treated soil.

Radioactive contamination (e.g., uranium, thorium radium, etc.) can be removed by soil washing. Soil washing provides a means to process soils having multiple contaminants. The washed soil is accessible to further biological or thermal treatment. Inorganic and radioactive compounds may be separated from organics for separate sale or disposal.

Many soil washing processes are available. Most use mining equipment to provide intimate soil/surfactant contact. U.S. Pat. No. 4,783,253 discloses a process for separating radioactive contaminants from soil using a concurrent flow of water to float away lighter uncontaminated particles from heavy contaminated particles. The slurry of lighter particles is dewatered using a spiral classifier, centrifuge, filter or the like. U.S. Pat. No. 4,783,263 is directed to a process for removing toxic or hazardous substances, in particular organics, from soils and the like by converting the material to a slurry adding surfactants and/or alkaline agents, and concentrating the toxic substance in the liquid phase preferably with a modifier in a froth flotation cell.

Some of the limitations of the currently used processes are that they are optimized for removing only one type of contaminant or for cleaning only one type of soil, they are geared to cleaning the larger particles while concentrating the fines in a fraction for later disposal, and they often use filtration for water removal which is a capital intensive operation with high operating costs.

Once the contaminants have been removed from the soil or other particulate material they must in turn be recovered for further processing, such as mining and/or smelting in the case of heavy metals, or disposal, for example, through mixing with a fixative material such as concrete. The ability to recover contaminants from the cleaning system is to a large extent dependent upon the method by which the contaminants were removed from the soil in the first instance. Mineral extraction in general and soil washing in particular often require the oxidation of the metals and sometimes the organic fraction of the soil for the removal of the metals. Radioactive metals are also included with heavy metals requiring oxidation since most radioactive materials are also inorganic heavy metals, such as uranium, thorium or radium.

Some typical oxidants include nitric acid, sodium hypochlorite and calcium hypochlorite. However, the use of nitric acid is generally not practical due to the fact that nitric acid is nonselective in its action, dissolving the rock matrix as well as oxidizing and dissolving the metal of interest, it is expensive, and results in nitrate-laden waste liquors which can present environmental hazards unless treated. Sodium hypochlorite is expensive to use because commercial solutions are supplied as a 15% liquid which increases the freight cost. Calcium hypochlorite introduces large amounts of calcium ion into the leachate solution when used in quantities sufficient to oxidize the metal, and the calcium ions can then precipitate if carbonate bleach liquors are used or if the leachate solution is left standing in contact with air. This calcium carbonate precipitate is difficult to handle and can clog processing equipment. In addition, if common soaps are used to remove organics, the high calcium ion content tends to precipitate some of the soap which requires use of additional soap.

There is a need therefore for an improved process and apparatus for treating particulate materials, such as soil and the like, contaminated with mixed wastes such as radioactive materials, organics and heavy metals.

There is a further need for such a process and apparatus which separates organic and inorganic contaminants thereby allowing for optimum disposal routes or post treatment strategies to be used on the concentrated contaminated fractions.

There is also a need for such a process and apparatus which produces a high solids content fines stream.

There is yet another need for such a process and apparatus which is not capital intensive, is economical to operate and can be made portable for on-site treatment.

There is a further need for a system that can effectively recover the contaminants once they have been removed from the soil, requiring a minimal amount of equipment, chemicals, and being portable to the job site, which further allows for the processing of recovered contaminants, such as metals, through mining and/or smelting operations, and allows for effective leach-resistant fixation of contaminants which are to be disposed.

SUMMARY OF THE INVENTION

These and other needs are satisfied by the invention which is characterized by treating particulate materials such as soils, sludges, sediments, scrap yard dust and the like, contaminated with radioactive compounds, heavy metals, and organics, either singly or in combination, by first washing the particulate material with a contaminant mobilizing solution which can consist of leaching solutions, surfactants, and mixtures thereof to mobilize soluble and dispersible contaminants in a liquid phase of the contaminant mobilizing solution. Mechanical separation means are then used to separate large particles of a size substantially free of residual contamination, typically larger than 5 mm, from intermediate sized particles and fines in the contaminant mobilizing solution. These separated large particles are washed with a water based cleaning solution to produce recovered particulate material. Fines are size separated from the intermediate sized particles in the contaminant mobilizing solution with a countercurrent flow of the contaminant mobilizing solution to form a waste slurry. The size separation is preferably performed in a mineral jig. The intermediate sized particles from which the fines have been separated are attrition abraded to dislodge attached fines. These dislodged fines are then separated from the intermediate sized particles by a countercurrent flow of wash water to form additional waste slurry and an effluent of the intermediate sized particles and wash water. The intermediate sized particles are dewatered to produce additional recovered particulate material. If the particulate material has been contaminated with insoluble heavy metals, they can be separated from the effluent of intermediate sized particles and wash water emerging from the second size separation by density separation such as by a cross-current pulsed flow of wash water prior to dewatering.

According to the present invention, the contaminants removed from the particulate matter are treated to effect their destruction, collection and/or disposal. The insoluble heavy metals may be treated with an oxidizing agent, such as $Cl_2$ and/or organics may be treated with a reducing agent, such as $H_2$. The oxidizing agent makes the heavy metals more soluble in the wash water process stream, and the reducing agent destroys the organics and/or makes them more environmentally acceptable. The oxidizing agent may also be used to treat certain organics. The clean particulate material can then be separated from the wash water process stream, and the heavy metals can be precipitated, using, for example, $Na_2SiO_3$ as the precipitant, and adjusting the pH of the wash water process stream to 8-10, preferably 9. Additional oxidizing or reducing agent can then be added to the wash water process stream for recycle.

The scrubbing of the particles removes the mineral slimes or fine particles adhering to the intermediate sized particles. As is known, these dislodged fine particles have a very large surface area which is chemically active. Some solubilized contaminants have a high affinity for the surface area of these fine particles. Hence, in accordance with the broad process defined by the invention, the dissolved contaminants are drawn off in the first size separation before scrubbing to dislodge fines. These dislodged fines are then separated in a second sizing countercurrent flow using wash water. In applications in which contamination of dislodged fines with dissolved contaminants is not a problem, another attrition abrading step can be carried out prior to the initial size separation of fines using a countercurrent flow of the contaminant mobilizing solution.

The invention is further characterized by using the water obtained by dewatering the intermediate sized particles remaining after the second size separation as the wash water for the second size separating countercurrent flow.

The countercurrent flow rate in the size separating steps can be adjusted to adjust the size of the fines removed. The adjustment is made to balance the percentage of soil particles recovered and allowable levels of residual contamination. Typically, fines smaller than about 60 microns are removed in the waste slurry. The actual size removed will be dependent upon the contaminant distribution as a function of particle size, and can vary from less than 200 to 10 microns.

Another novel aspect of the invention is the operation of a mineral jig in a countercurrent flow mode to effect size separation of fines from the slurry while simultaneously washing the particulate material. In one stage the mobilizing solution is used to produce the countercurrent flow, while wash water is used in the final size separating stage for removing fines.

The waste slurry from the two countercurrent flow size separating steps containing the fines, dissolved metals including the radioactive contaminants, and the organics, is further treated to remove the fines and contaminants and to produce clean contaminant mobilizing solution which is recirculated. In one embodiment of the invention the dissolved metals are precipitated by a sulfide. In a preferred embodiment, the dissolved metals are made more soluble in the contaminant mobilizing solution with an oxidizing or reducing agent, and then, after clean particulate material is removed, these dissolved metals are precipitated, e.g., with $Na_2SiO_3$. The precipitates and fine soil particles are removed by dewatering and the decontaminant mobilizing solution can be further treated such as in an ion exchange bed to remove radioactive soluble contaminants and passed through a carbon bed to remove the organic load before being recycled. Alternatively, the contaminant mobilizing solution (process stream) can be treated with $CaCl_2$ to remove contaminated surfactants for total removal of the surfactants from the process stream.

BRIEF DESCRIPTIONS OF DRAWINGS

A full understanding of the invention can be gained from the following description of the preferred embodiments when read in conjunction with the accompanying drawings in which.

DESCRIPTION OF THE PREFERRED EMBODIMENTS

The invention is suitable for treating various types of particulate materials, and especially contaminated soil, but it can also be used to treat sludges, sediments, scrap yard dust and the like. These particulate materials can be contaminated with heavy metals, organics and radioactive species either alone or in combination.

Figure 1:
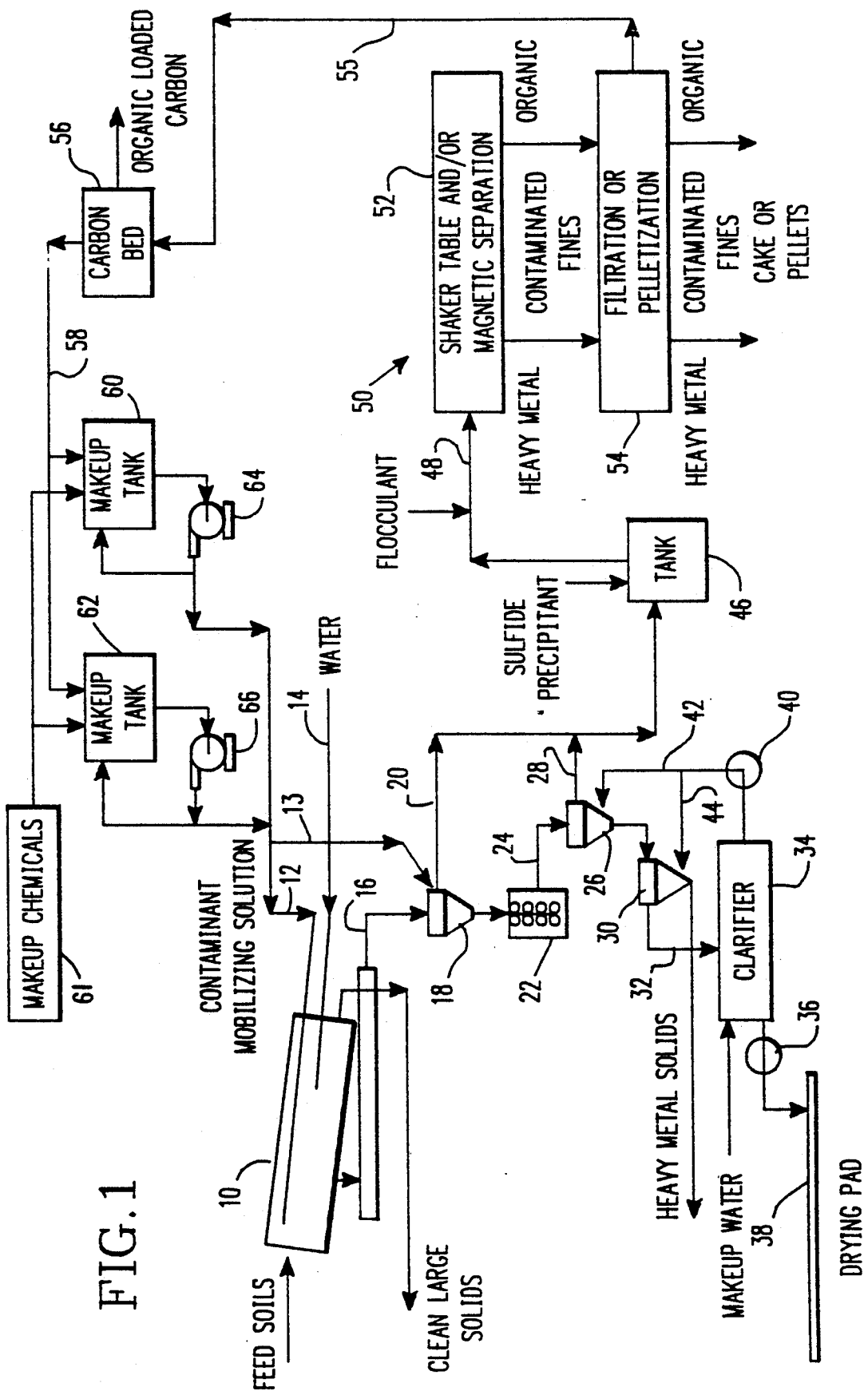
FIG. 1 is a flow sheet of a first embodiment of the invention.

FIG. 1 illustrates a first embodiment of the invention. Initially, the excavated soil is processed to remove large rocks and debris. This step is not shown in FIG. 1. The soil is then processed in a mechanical size separator 10 such as for instance a rotating drum or vibrating screen device to sort and prewash the feed soil with a contaminant mobilizing solution, provided through line 12. Large pieces of soil, for instance larger than 5 mm are washed with the contaminant mobilizing solution, rinsed with water supplied through line 14, checked for residual contaminants, and returned to the site as recovered soil. The contaminant mobilizing solution (or process stream) used to wash the soil will be dependent upon the contamination to be removed. For soluble contaminants, the solution will contain a leaching agent. Many suitable leaching agents are known and common leaching agents suitable for leaching radioactive compounds include for example potassium carbonate, sodium carbonate, acetic acid, sodium hypochloride, and others. Leaching agents for contaminants typically found in contaminated soils and the like are well known. For dispersible contaminants, the contaminant mobilizing solution contains a suitable surfactant. Again, suitable surfactants for dispersing contaminants such as oil, grease, polychlorinated biphenyls, etc., are also known. The contaminant mobilizing solution may contain various combinations of leaching agents and surfactants, again, depending on the contaminants in the soil to be cleaned.

The effluent of soil particles smaller than 5 mm and contaminant mobilizing solution discharged from the mechanical separator 10 through line 16 is then processed in a countercurrent flow size separator such as the mineral jig 18. In the jig 18, additional contaminant mobilizing solution supplied through line 13 flows upwardly countercurrent to the effluent. The fines are carried upwardly with the upward flow of contaminant mobilizing solution to form a slurry which is discharged through a line 20. These fines typically include heavy metal particles. The velocity of the upward flow of contaminant containing solution in the mineral jig 18 is set to separate fines of a desired size, for example fines smaller than 60 microns in diameter. The slurry discharged in the line 20 includes, in addition to the fines, contaminant mobilizing solution which contains leached and dispersed metals and organics.

Heretofore, mineral jigs such as that disclosed in U.S. Pat. No. 4,783,253, have only been operated in a concurrent flow mode. We operate the mineral jig 18 in a countercurrent flow mode. For such countercurrent flow operation, the jig can be operated with a stroke length of ⅛ to ⅜ inch, a pulse frequency of 300 to 400 per minute, an upflow rate of contaminant mobilizing solution of 1 to 8 liters per minute an underflow rate of 1 to 3 liters per minute, with one layer of balls 3/16 inch in diameter or greater to provide a soil under flow of 80 to 95 percent and soil over the top of 20 to 5 percent.

The intermediate sized particles between 5 mm and 60 microns in diameter, which are discharged from the bottom of the mineral jig 18, are abraded in an attrition scrubber 22 which dislodges mineral slime or fines from them. The intermediate sized particles and the dislodged fines discharged from the attrition scrubber 22 through line 24 are rinsed in a second countercurrent flow size separator such as the second mineral jig 26 operated in the manner discussed above in connection with jig 18. The countercurrent flow in the second mineral jig 26 is wash water which flows upwardly at a velocity again selected to separate the dislodged fines, typically of 60 microns in diameter and smaller. The slurry of fines and wash water is discharged through line 28.

The remaining intermediate sized particles discharged from the second mineral jig 26 are processed in a density separator such as a cross-current flow jig 30 to extract higher density heavy metal solid waste particles. The mineral jig 30, which is similar to the jigs 18 and 26 is operated in the cross-current flow mode with a stroke length of ⅛ to 3/16 inch, a pulse frequency of 100–400/min, a water upflow rate of 1 to 8 liters/min, one to three layers of balls less than 3/16 inch to provide soil over the top of 80 to 95 percent and a soil underflow of 20 to 5 percent. The cross-current flow carrying the intermediate sized soil particles is discharged through a line 32 into dewatering apparatus such as, for instance, a clarifier 34 or a hydroclone. Sludge from the clarifier 34 is pumped by a pump 36 onto a drying pad 38. The dried particles recovered from the drying pad are checked for cleanliness and returned to the site as additional cleaned soil. Water removed by the clarifier 34 is circulated by a pump 40 through a line 42 as the countercurrent wash water for the second mineral jig 26, and through line 44 as the cross-current flow for the density separator jig 30.

The two waste slurry streams in the lines 20 and 28 from the first and second mineral jigs 18 and 26, respectively, are discharged into precipitation equipment 46 to which is added a precipitant to precipitate the dissolved metals. A sulfide or other suitable agent can be used to precipitate the dissolved metals present in a particular contaminated soil. These precipitates and fine soil particles will be highly contaminated with organics and heavy metals. A flocculant, such as for example Nalco 7182, an anionic polymer that does not interfere with trace metal absorption and co-precipitation, supplied by the Nalco Chemical Company, Naperville, Ill., is added to the precipitates and fines conveyed from the precipitation equipment 46 through a line 48 to dewatering apparatus 50 which may include for instance Bardles-Mozley concentrator 52 which separate micron size particles of high specific gravity. Simultaneously, fine particles are washed by the high shear, orbital shaking of the table. Fine soil solution which is washed from the table is passed through high intensity matrix magnetic separators which remove micron sized particles coated with weakly paramagnetic hydroxides containing inorganic contaminants. Solids from the remaining solution are then separated from the stream by either filtration or flocculation settling and pelletizing in apparatus 54. The organically contaminated fractions can be further treated biologically, chemically or thermally and returned to the site.

Concentrated solids removed by the Bartles-Mozley concentrator 52 can be disposed of or sold as a concentrate. The filtrate is passed through the line 55 to an activated carbon bed 56 to remove all organics before being sent through line 58 for recycling. The recycled solution is discharged in the one of two contaminant containing solution makeup tanks 60 and 62 which is not currently being used to feed the process. Makeup chemicals 61 may be supplied to the makeup tanks 60 and 62. The contaminated activated carbon in the bed 56 can be thermally or chemically treated or buried. The recycled contaminant mobilizing solution is analyzed and an active component such as caustic or emulsifier are made up on a batch basis in the off-line makeup tank 60 or 62. Contaminant mobilizing solution from the active one of the tanks 60 and 62 is pumped by the pump 64 or 66, respectively, through the line 12 to the mechanical size separator 10 and through the line 13 to the first mineral jig 18.

Figure 2:
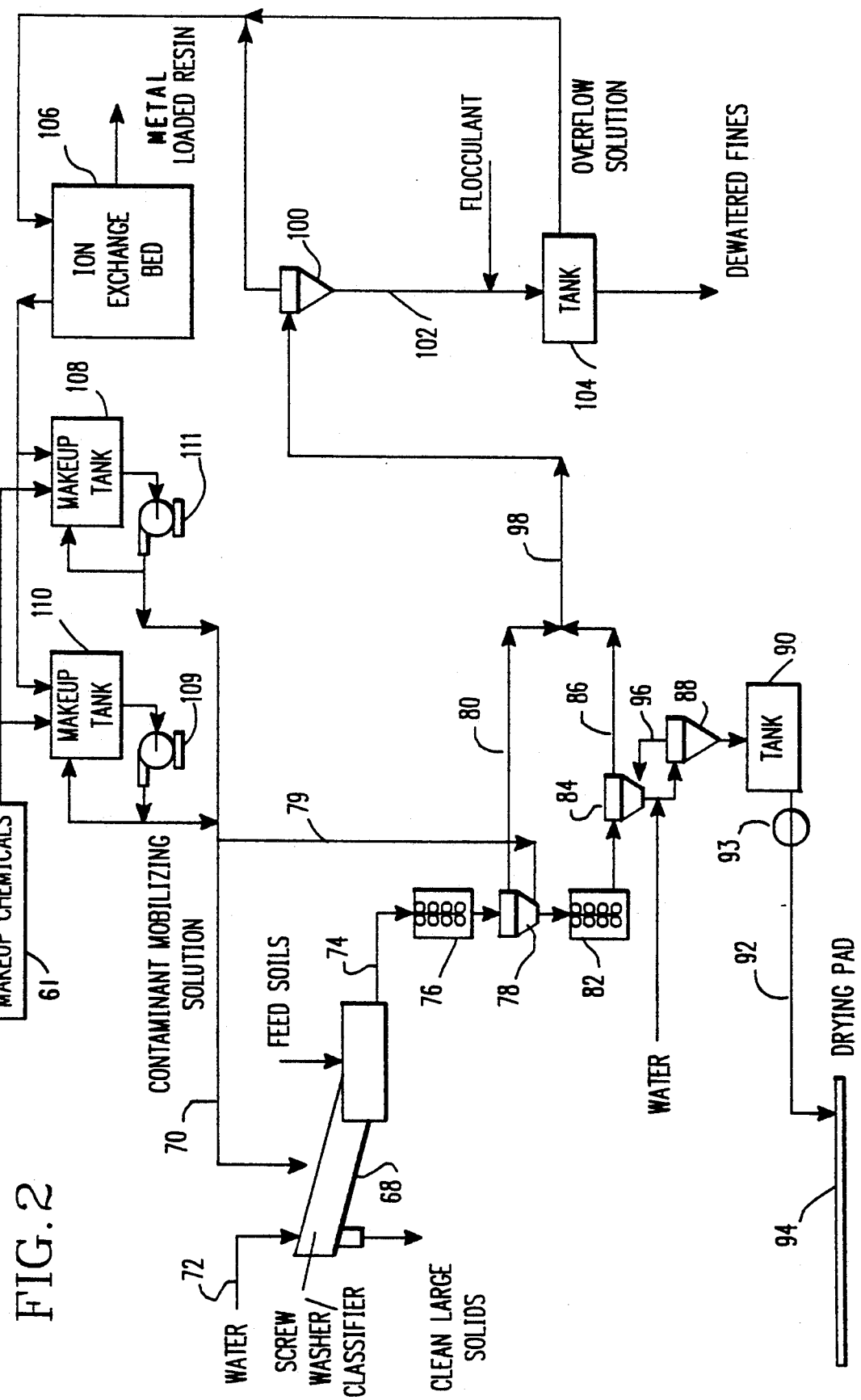
FIG. 2 is a flow sheet of a second embodiment of the invention.

FIG. 2 illustrates a modified embodiment of the invention in which the contaminated soil, after large pieces have been removed, is fed to a mechanical size separator in the form of the screw washer/classifier 68 where the soil is washed with the contaminant mobilizing solution supplied through a line 70, and where the larger particles are rinsed with a water based cleaning solution introduced through line 72 and discharged as clean large solids. The intermediate sized particles and fines are passed through a line 74 to a first attrition scrubber 76 where attached fines are dislodged from the intermediate sized particles. The abraded particles are then discharged into a countercurrent flow size separator in the form of a first mineral jig 78. The countercurrent flow in mineral jig 78 is provided by contaminant mobilizing solution supplied through the line 79. A slurry of fines and contaminant mobilizing solution containing dissolved and or dispersed contaminants is discharged from mineral jig 78 through the line 80. The intermediate sized particles are passed through a second attrition scrubber 82 where they are again abraded to dislodge additional attached fines, and a second countercurrent flow size separator in the form of a mineral jig 84 which uses an upward flow of wash water to separate the additional dislodged fines in a waste slurry which is discharged through line 86. The remaining intermediate sized particles are dewatered in a hydroclone 88 and then clarified in a tank 90. Sludge from the tank 90 is deposited through a line 92 on a drying bed 94 by a pump 93 to produce additional cleaned soil to be returned to the site. Water removed by the cyclone 88 is recycled as the wash water through line 96 to the second mineral jig 84. Makeup water is added as required through line 97.

The two waste slurry streams in lines 80 and 86 are delivered through line 98 to dewatering apparatus which includes hydroclones 100. The cleaned fines from the hydroclones 100 are discharged through a line 102 into a precipitation reactor 104 to which a flocculant is added. Dewatered fines can be removed from the reactor 104 for disposal, or for further treatment. Overflow solution from the tank 104 and discharged from the cyclone 100 is recycled. Where the contaminants include radioactive compounds or heavy metals, the recycled solution can be passed through an ion exchange bed 106 to remove the soluble metals before being discharged into the contaminant mobilizing solution makeup tanks 108 and 110. Again, while makeup chemicals 61 are being added to one makeup tank 108 or 110, contaminant mobilizing solution is being pumped by a pump 109 or 111 from the other tank to the screw washer/clarifier 68 and the first mineral jig 78.

Figure 3:
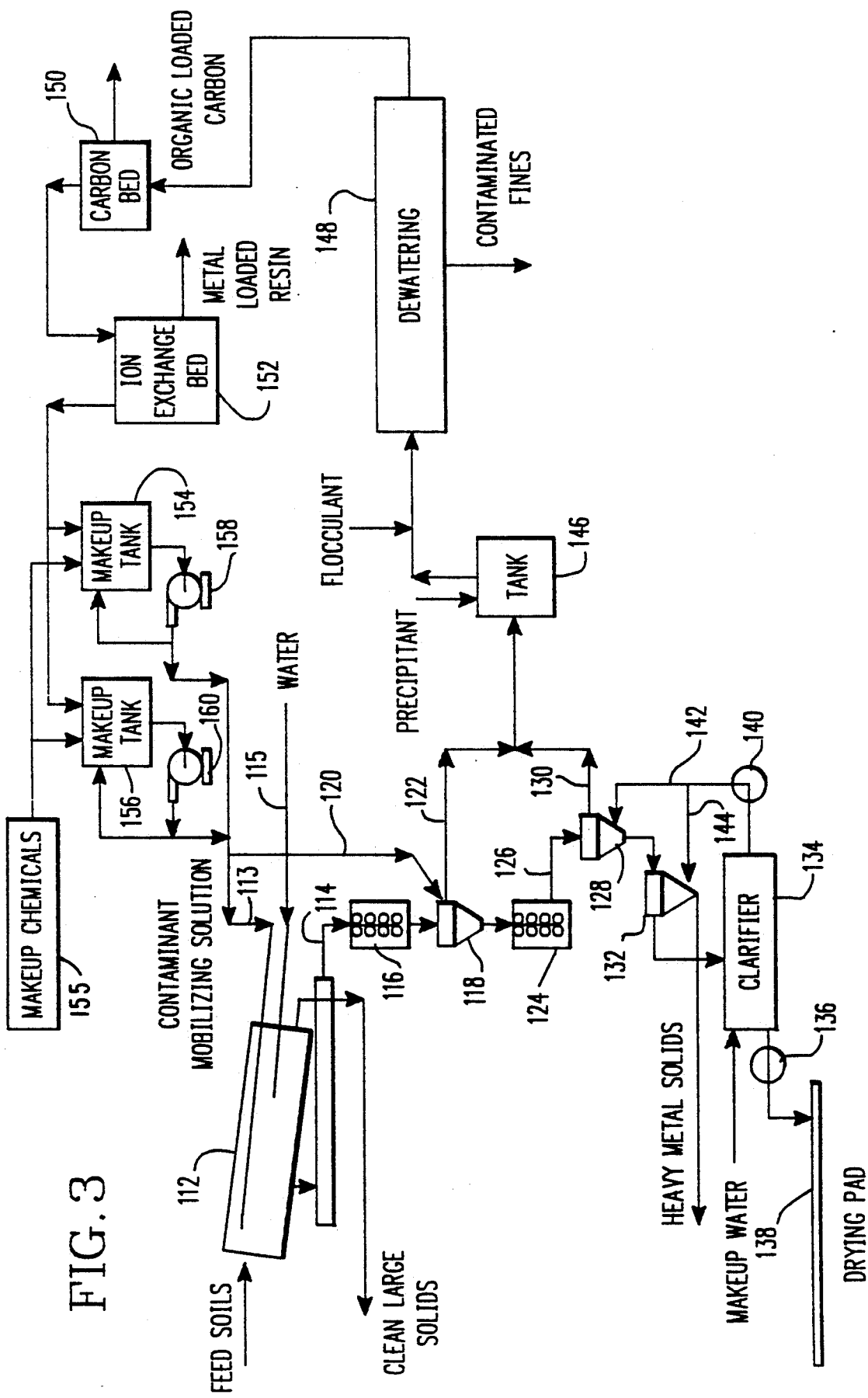
FIG. 3 is a flow sheet of yet another embodiment of the invention.

FIG. 3 illustrates yet another embodiment of the invention. This embodiment utilizes a screen/washer mechanical size separator 112 similar to that used in the first embodiment to wash the feed soils with contaminant mobilizing solution supplied through line 113 and to separate and rinse with water provided through line 115 the large particles such as those over 5 mm. The intermediate sized particles and fines are then carried through a line 114 to a first attrition scrubber 116 which dislodges attached fines from the intermediate sized particles. The fines including those dislodged in the attrition scrubber 116 are then separated from the intermediate sized particles in a countercurrent flow size separator such as the first mineral jig 118 where the countercurrent flow is contaminant mobilizing solution provided through the line 120. The waste slurry containing the fines and solubilized and dispersed contaminants is discharged through the line 122. The remaining particles are passed through a second attrition scrubber 124 and then through a line 126 to a second mineral jig 128 for size separation by the countercurrent flow of rinse water. The waste slurry containing the fines is discharged from the second mineral jig 128 through line 130.

The intermediate sized particles discharged from the second mineral jig 128 are passed through a classifier or gravity separator such as a cross-current flow jig 132 to remove heavy metal particles for disposal. The remaining intermediate sized particles are dewatered such as in clarifier 134. Again, the sludge from the clarifier 134 is discharged by pump 136 onto a drying pad 138 to produce additional clean soil. Water removed in clarifier 134 is recirculated by the pump 140 through a line 142 to supply the countercurrent flow to the second mineral jig 128 and through a line 144 to the cross-current flow jig 132.

As in accordance with the invention, the waste slurry stream in lines 122 and 130 is treated to remove the contaminants and recirculate the contaminant mobilizing solution. The particular treatment of this waste slurry depends on the type of contaminants extracted from the soil. In the embodiment shown in FIG. 3 dissolved metal contaminants are precipitated in reactor 146 and the resulting precipitants and fines are separated by dewatering which includes the addition of a flocculant. The dewatering apparatus 148 may comprise the apparatus used in the embodiments in FIGS. 1 and 2 or other dewatering apparatus. Organic contaminants are removed from the recycled contaminant mobilizing fluid in a carbon bed 150 while the soluble radioactive contaminants which were not removed by precipitation are extracted in an ion exchange bed 152. Again, the recycled contaminant mobilizing solution is returned to the one of two makeup tanks 154 and 156 which is not currently in use, and is pumped by a pump 158 or 160 from the active tank to the screen/washer 112 and the first mineral jig 118. Makeup chemicals 155 may be supplied to the makeup tanks 154 and 156.

In a preferred embodiment of the invention, the contaminant mobilizing solution, or process stream, is provided with an oxidizing or reducing agent, for example, selected from the group $Cl_2$, $ClO_2$, $O_3$, which increase the solubility of the contaminants, most particularly the metal contaminants, in the process stream. This, in turn, assists in removing such contaminants from the feed soils, or contaminated particulate material fed to the soil washing system.

Figure 9:
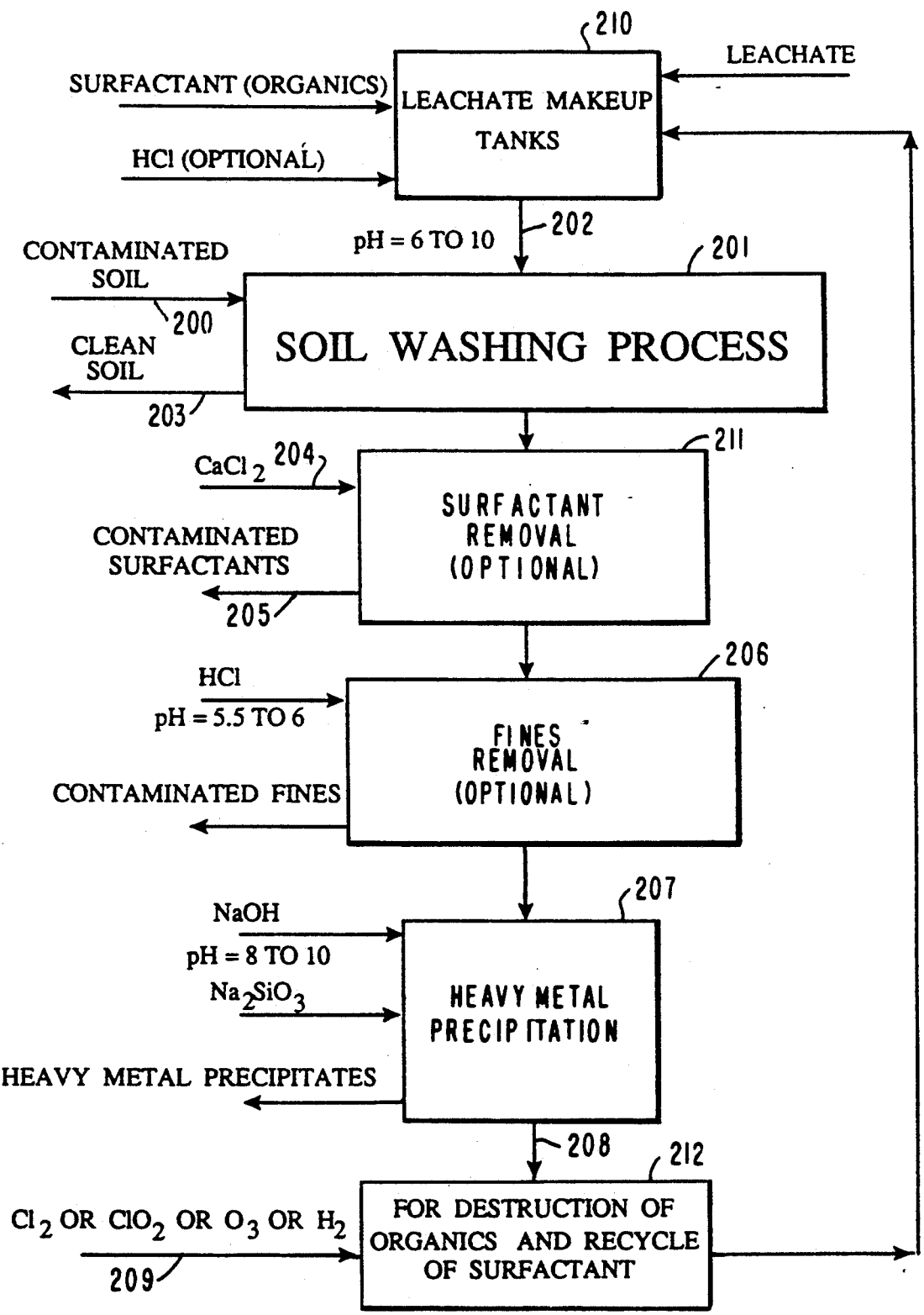
FIG. 9 is a flow sheet of yet another aspect of the invention.

A preferred embodiment of this aspect of the invention is illustrated in FIG. 9. As illustrated, feed soils, or contaminated particulate material 200 is fed to a soil washing process, 201, which may be any of the processes described herein, as well as those known in the art. The contaminated particulate material may contain various heavy metals, such as Hg, U, Pb, Ag, As, Cd, Cr, Cu, Ra, Th as well as organics, such as oils, PCBs, flue soot and radioactive compounds. The contaminants are removed from the particulate material by a contaminant mobilizing solution or process stream 202, contained in a makeup tank 210, which may contain a leachate and/or surfactant as previously described. Preferably, the process stream, which at this point has a pH of 6–10, contains an oxidizing agent or a reducing agent, for example, $Cl_2$, $ClO_2$, $O_3$ or $H_2$, which increases the solubility of at least one of the contaminants in the process stream, thereby effecting more efficient removal of the contaminants from the contaminated particulate matter and also improving the mobility of the contaminants through the process. Most preferably, when the heavy metal component is to be removed, an oxidant such as $Cl_2$ is used in a high pH stream (8–10, preferably 9), which favors $Cl_2$ absorption. In this case, a precipitant, such as $Na_2SiO_3$ is used to precipitate the heavy metals, which remain in solution in said process stream following removal of clean particulate matter therefrom. The precipitant may also flocculate any precipitated heavy metal hydroxides, fines and/or precipitated soaps.

Referring now to FIG. 9, the process stream 202 passes through the soil washing process 201, and clean soil or particulate matter 203 is removed from the process stream 202. If surfactants are used, and are not to be recovered for recycle, a surfactant precipitating agent 204, such as $CaCl_2$ or other soluble calcium salt, is introduced to the process stream 202 at a surfactant removal system 211 following removal of the clean particulate material 203, and contaminated surfactants 205 are removed from the process stream 202 for further treatment or disposal.

If the surfactants are to be recovered for recycle, or if no surfactants are used, no surfactant precipitating agent is introduced to the process stream 202. At this point in the process, fines may be removed via a fixed removal means 206. Fines removal may be by known methods, such as electro-coagulation, for example, using an ACE Separator manufactured by Electro-Pure Systems, Amherst, N.Y., followed by cyclones, which separate the contaminated, coagulated fines from the process stream.

As fines removal generally requires adjusting the pH of the process stream to 5.5–6, and precipitation of heavy metals occurs generally at a higher pH, the pH is preferably adjusted to 8–10, preferably 9 for metals precipitation, for example by adding NaOH to the process stream 202, along with the addition of a precipitant, such as $Na_2SiO_3$.

The precipitated metals are removed from the process stream, via a precipitant removal means 207, for example, by electro-coagulation followed by cyclones, or filtration, classification, centrifugation or high efficiency cyclones. An advantage of the invention is that it does not require large, permanent settling ponds, rather, can utilize portable equipment which can be moved from one job site to another. The precipitated heavy metals may be re-dissolved in NaOH solutions to recover the heavy metal and regenerate the $Na_2SiO_3$, as disclosed in U.S. Pat. No. 5,077,020, which issued on Dec. 31, 1991, from U.S. patent application Ser. No. 652,475, filed Feb. 8, 1991, which is a continuation of U.S. patent application Ser. No. 453,744, filed Feb. 20, 1989, and now abandoned.

Following removal of the heavy metal precipitants, the process stream becomes a recycle stream 208, which may be used to recycle leachate and/or surfactants for washing of additional contaminated particulate matter. In the case where all contaminated surfactants have been removed from the process stream 202, the recycle stream 208 may be recycled directly to the soil washing process after addition of makeup chemicals, such as leachates and/or surfactants, if any.

In the case where the recycle stream contains organics and/or surfactants, it is desirable to add oxidizing agent and/or reducing agent 209 to the recycle stream for the destruction of such organics using an organic destruction system 212. The preferred oxidizing agent is $Cl_2$, which is highly absorbed in the high pH recycle stream. The preferred reducing agent is $H_2$. Preferably, $H_2$ may be used to reduce all organics contaminants, while $Cl_2$, $ClO_2$ and $O_3$ are used to oxidize non-aliphatic organic contaminants preferentially to the surfactants. The oxidizing and/or reducing agent may be added to the process stream at any convenient point in the process. Preferably when $Cl_2$ is used it is introduced to the recycle loop, after removal of particulate matter, under pressure through a diffuser which assists in dissolving the $Cl_2$ into the process stream. When $H_2$ is used, it is preferably introduced to the process stream via a catalytic bed, which assists in dissolving the $H_2$ into the process stream. The amount of oxidizing/reducing agent used depends upon a variety of factors, including the concentration of contaminants in the process stream, the nature of those contaminants and the rate at which they use up the oxidizing/reducing agent(s).

Of course, it is necessary to use the oxidant and reducing agent in separate treatment steps, if both are used in the process, for example by using the oxidizing agent first to remove the heavy metals and then removing any remaining oxidizing agent, and then use the reducing agent in the process stream to treat the organics. Reducing agents are especially useful in treating organics which are resistant to oxidation, such as PCB's.

If the surfactants are to be recovered for recycle, it is preferred that aliphatic surfactants be used. If the surfactants are not to be recovered for recycle, aromatic surfactants may be used, preferably with $H_2$ reduction, and aliphatic surfactants may be used preferably with oxidation.

As can be readily appreciated, there are numerous possible combinations of the process of the present invention. Several of these these combinations are summarized in Table 1 below.

TABLE 1

| Various Configurations Of This Process | | | |
| --- | --- | --- | --- |
| Contaminant | Recover Metal | Recover Surfactant | Recover Fines |
| Metal | No-precip. with $Na_2SiO_3$ | | No-remove with precipitated metals |
| Metal | No-precip. with $Na_2SiO_3$ | | Yes-remove before precipitated metals |

TABLE 1-continued

| | Various Configurations Of This Process | | |
|---|---|---|---|
| Contaminant | Recover Metal | Recover Surfactant | Recover Fines |
| Metal | Yes-precip. with $Na_2SiO_3$ | | No-remove before precipitated metals |
| Metal | Yes-precip. with $Na_2SiO_3$ | | Yes-remove with precipitated metals |
| Organic | | No-precipitate with $CaCl_2$ | No-remove with precipitated surfactant |
| Organic | | Yes-treat with $H_2$ or oxidant | No-remove before $H_2$/oxidant treatment |
| Organic | | No-precipitate with $CaCl_2$ | Yes-skim precipitated surfactant |
| Organic | | Yes-treat with $H_2$ or oxidant | Yes-remove before $H_2$/oxidant treatment |
| Metal/Organic | No-precip. with $Na_2SiO_3$ | No-precipitate with $CaCl_2$ | No-remove with precip. metals/surfactants |
| Metal/Organic | No-precip. with $Na_2SiO_3$ | Yes-treat with $H_2$ or $Cl_2$ | No-remove before $H_2$/oxidant treatment |
| Metal/Organic | No-precip. with $Na_2SiO_3$ | No-precipitate with $CaCl_2$ | Yes-skim precipitated surfactant |
| Metal/Organic | No-precip. with $Na_2SiO_3$ | Yes-treat with $H_2$ or $Cl_2$ | Yes-remove before precipitated metals |
| Metal/Organic | Yes-precip. with $Na_2SiO_3$ | No-precipitate with $CaCl_2$ | No-remove before precipitated metals |
| Metal/Organic | Yes-precip. with $Na_2SiO_3$ | Yes-treat with $H_2$ or $Cl_2$ | No-remove before precipitated metals |
| Metal/Organic | Yes-precip. with $Na_2SiO_3$ | No-precipitate with $CaCl_2$ | Yes-skim precipitated surfactants |
| Metal/Organic | Yes-precip. with $Na_2SiO_3$ | Yes-treat with $H_2$ or $Cl_2$ | Yes-remove before precipitated metals |

In general, there are three primary cases which may be employed in practicing the invention, which include: (1) leached metal is to be recovered separately from fines; (2) metal and fines are recovered together; and (3) organics are recovered with the fines and metal may be covered separately from the fines or together with the fines and organics.

The first case is used when it is desired to recover the leached metal separately from the fines. In this case, the fines are sent to either a high efficiency cyclone or to a filter or are electro-coagulated and cycloned for removal from the process stream. The cleaned process stream is then pH adjusted to about 9 using sodium hydroxide or other suitable base. Sodium silicate or other precipitant is then added to precipitate the heavy metal and to flocculate the metal hydroxides which precipitated due to the pH adjustment. The precipitated metals are then removed, for example, using either filtration, clarification, centrifugation or a cyclone. The treated water is then chlorinated to regenerate the required active chlorine level, pH adjusted to 6-10 and recycled to the soil washing process.

The second case is used when the metal is not to be recovered separately from the fines. In this case, the process stream (after removal of clean particulate material, but not fines) is pH adjusted to about 9 using sodium hydroxide or other suitable base. Sodium silicate or other precipitant is then added to precipitate the heavy metal and to flocculate the metal hydroxides which precipitated due to the pH adjustment as well as the fines. The precipitated metals and fines are then removed from the process stream, for example, using either filtration, clarification, centrifugation or a cyclone. The treated water is then chlorinated to regenerate the required active chlorine level, pH adjusted to 6-10 and recycled to the process.

The third case is used when an organic contaminant has been removed from the soil or particulate material and is not to be recovered separately from the fines. In this case, the process stream is pH adjusted to about 9 (following removal of clean particulate material) using calcium chloride plus sodium hydroxide or other suitable base. If heavy metals are not to be recovered separately from the fines, sodium silicate or other precipitant is then added to precipitate the heavy metal and to flocculate the metal hydroxides which precipitated due to the pH adjustment as well as the fines and precipitated soaps. The precipitated metals, soaps and fines are then removed, for example, using either filtration, clarification, centrifugation or a cyclone. The treated water, or recycle stream, is then chlorinated to regenerate the required active chlorine level, pH adjusted and recycled to the process.

If the metals are to be recovered separately from the fines, the sodium silicate is added after the fines and precipitated soaps are removed. After sodium silicate is added the metal precipitate is removed before the process stream is chlorinated, pH adjusted and recycled to the process.

The precipitates and fines will generally be highly contaminated with organics and heavy metals. Using the process described above, a variety of treatment methods are available for concentrating or recovering the metals from the organics or non-contaminated fines. These methods include, but are not limited to, shaking table, high gradient magnetic separation, or sodium dissolution of the silicate. The organically contaminated fraction can then be further treated biologically, chemically or thermally and returned to the site. The heavy metal fraction can be leached and returned to the site, disposed of or sold as a concentrate.

There are several advantages attendant the preferred embodiments of the invention. The first is the lower chemical costs. Due to the use of chlorine oxidant, chemical transportation costs are reduced as compared to the use of hypochlorite-containing chemicals. In addition, the use of chlorine minimizes the use of both the NaOH and HCl, further reducing chemical costs. Sodium silicate and calcium chloride are also available as highly concentrated solutions in bulk quantities in trailer trucks at low cost. For example, in a recent case in which uranium and mercury were to be removed from a soil, the use of chlorine instead of either sodium or calcium hypochlorite reduced the cost of chemicals 50%.

A second advantage is the character of the sodium silicate-heavy metal precipitate which is produced by this process. This precipitate has been shown in both laboratory and production application to be dissolvable in 50° C. NaOH solutions. This dissolution process leaves behind a sludge with a very high concentration of the heavy metal which was removed from the soil, and allows the sodium silicate to be reused. This sludge is often high enough in concentration to allow use as a feed stock in mining/smelting operations. This approach changes a potentially hazardous material (the heavy metal precipitate) into a valuable feedstock which reduces the future liability of the owner of the decontaminated soils or particulate material.

Another advantage of the invention is that it permits the selective removal of heavy metals and organics, thereby allowing mixed wastes, such as those containing both metals and organics, to be effectively treated.

Finally, if the precipitated solids must be disposed of, the washed precipitates which result after dissolution of the waterglass are low in sodium. This sludge results in a more leach-resistant matrix when mixed with concrete, glass or other fixative material, since the amount of leachable sodium is low.

Examples of soil cleanup using the various embodiments of the invention follow. The standards for these examples were the toxic chemical leaching procedures (TCLP) established for the particular site by the Environmental Protection Agency. For the first three examples, the results are illustrated in line graph form to show a continuum of the effect of the settings of the countercurrent flows in the mineral jigs which determines the size of fines removed, and consequently the percentage of the feed soil recovered.

EXAMPLE 1

Industrial site soil contaminated with about 11,000 ppm of copper was treated in accordance with the embodiment of the invention set forth in the flow chart of FIG. 1. The contaminant mobilizing solution was a one percent by weight aqueous solution of acetic acid which was used in the initial wash phase in the screen/washer 10 and in the first mineral jig 18. Water recovered from the clarifier 34 was used as the rinse in the second mineral jig 26 and the cross-current density separator 30.

Figure 4:
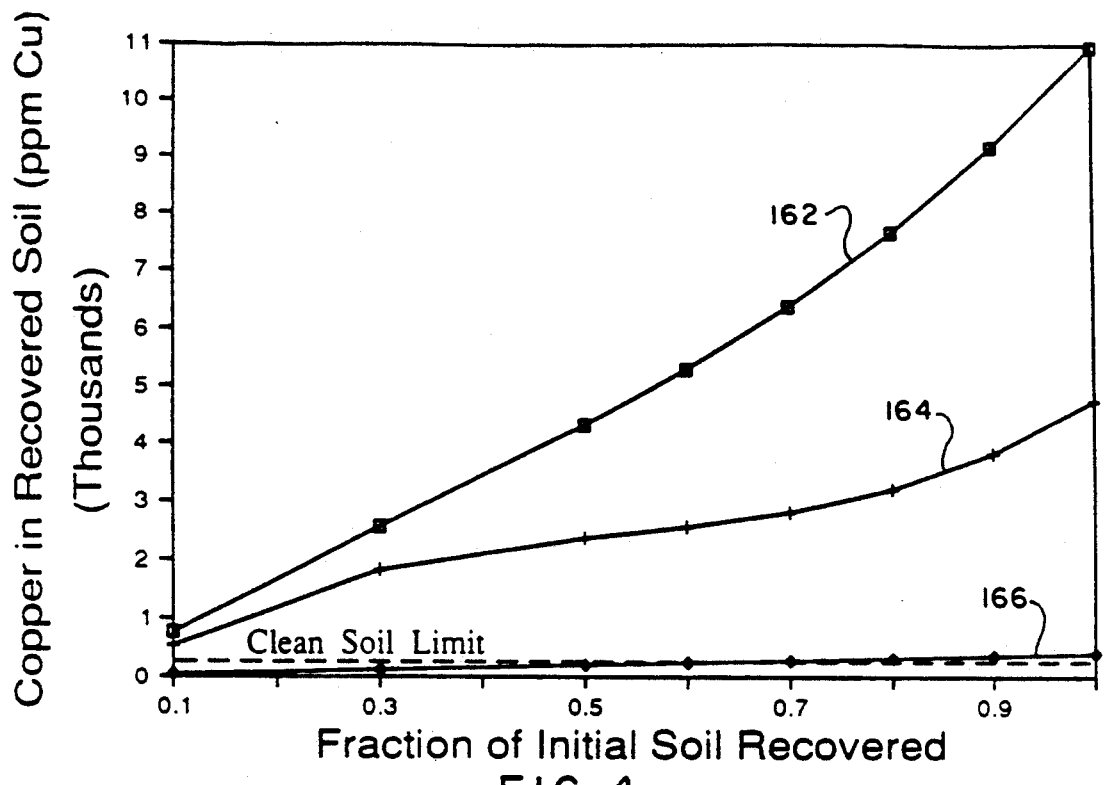
FIG. 4 is a line chart illustrating the results of an example of cleaning soil using the embodiment of the invention illustrated in FIG. 1.

The results of the tests are shown in FIG. 4. The untreated soil is represented by the trace 162, the results of soil washed only with water shown by the trace 164 and the results of the use of acetic acid as the contaminant mobilizing solution which dissolves the copper which is then carried off with the waste slurry from the mineral jigs 18 and 26 is shown by the trace 166. While the initial contamination was about 11,000 ppm of copper, it can seen that with the use of the invention, most of the copper was removed. The clean soil limit for this site was 250 ppm. It can be seen that by adjusting the countercurrent flow in the mineral jigs so that 80% of the initial soil was recovered that this clean soil limit was satisfied. Even at 90% recovery, the residual copper contamination was only 50 ppm above the clean soil limit.

EXAMPLE 2

Figure 5:
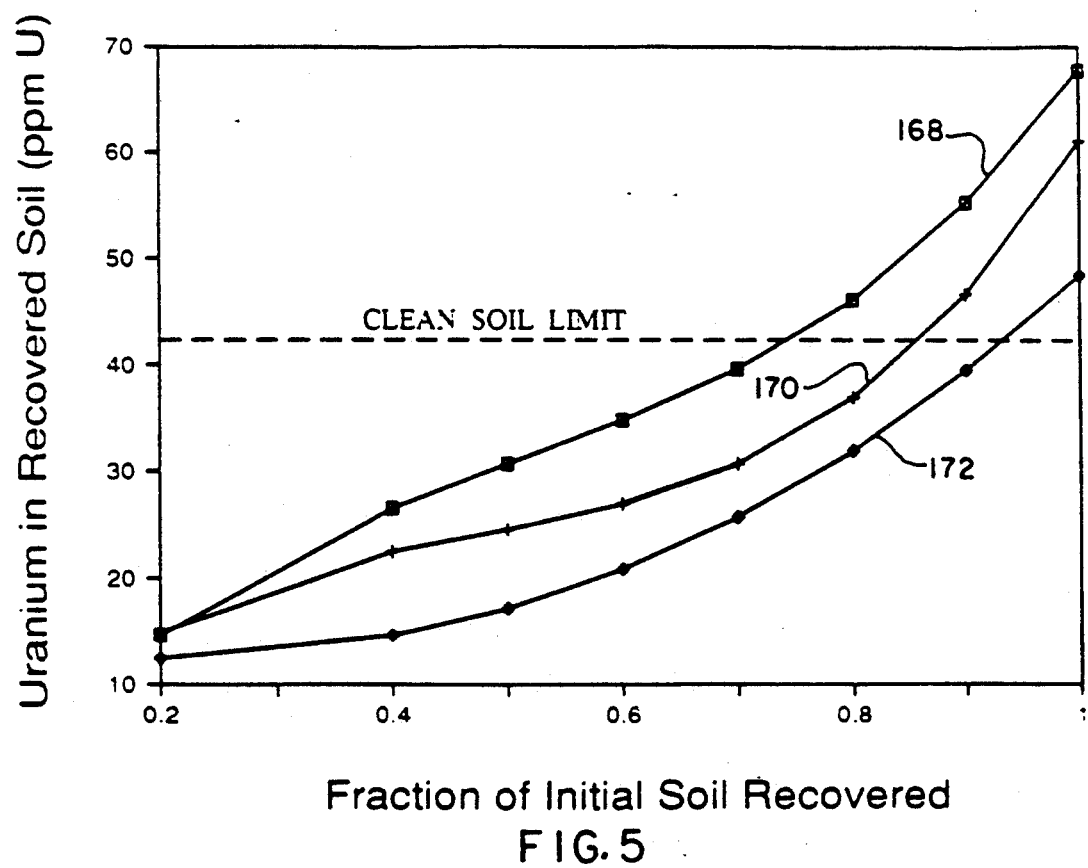
FIGS. 5 and 6 are line charts illustrating the results of two examples of cleaning soil using the embodiment of the invention illustrated in FIG. 2.

Soil contaminated with 69 ppm of radium was treated according to the embodiment of the invention shown in FIG. 2 using a 0.1 molar aqueous solution of potassium carbonate and a 0.1 molar solution of sodium carbonate as the contaminate mobilizing solution. The rinse water was the water recovered by the dewatering hydroclone 88. In FIG. 5, which illustrates the results of this example, the trace 168 represents the untreated soil, trace 170 represents soil washed only with water, and the trace 172 shows the results of the soil treated with the potassium carbonate and sodium carbonate chemical wash and rinsed with water. It can be seen from FIG. 5 that most of the contamination resides in the fine fraction so that even untreated soil from which only about 25% of the smaller particles are removed meets the clean soil limit of 42 ppm of uranium shown by the dotted line. With the invention, over 90% of the soil was recovered within the clean soil limit of 42 ppm of uranium.

EXAMPLE 3

Figure 6:
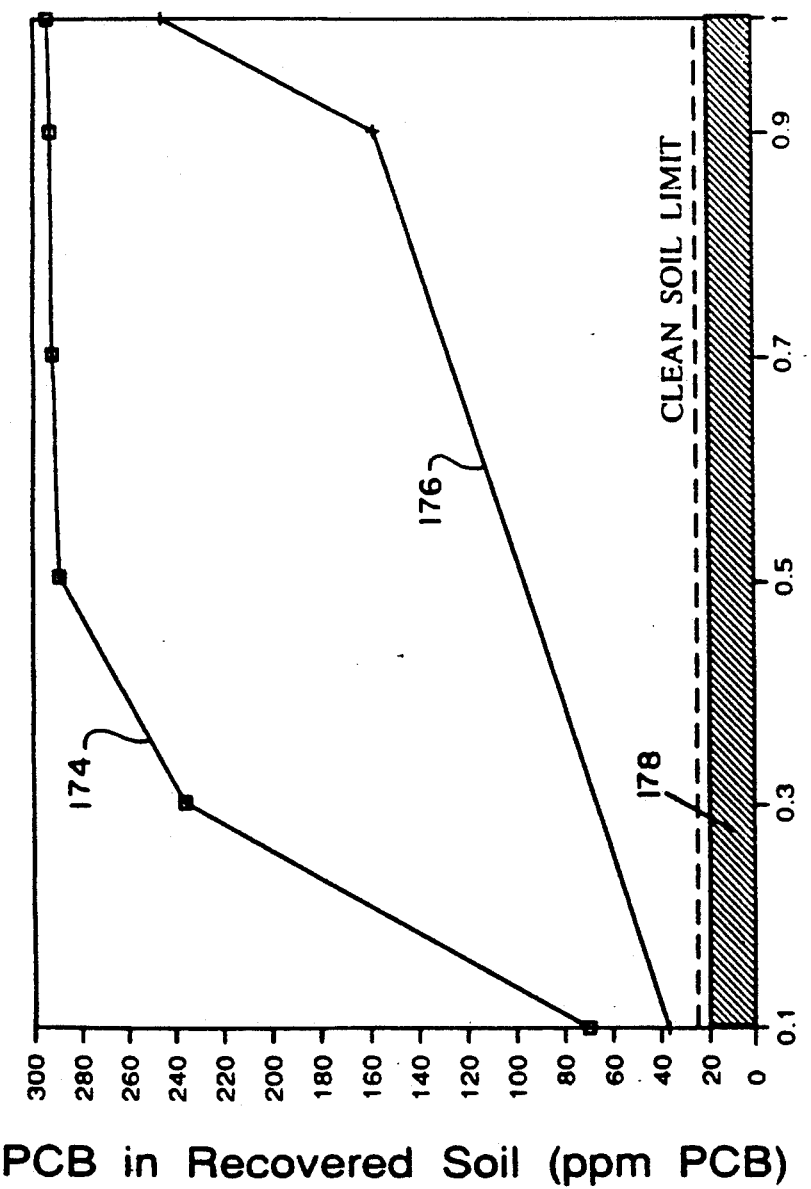

Soil contaminated with approximately 295 ppm of polychlorinated biphenyls was treated according to the embodiment of the invention illustrated in FIG. 2. The contaminant mobilizing solution in this example was a one percent by weight solution of NP90 a surfactant produced by Henkel Corporation together with a one percent by weight solution of Adsee 799, a surfactant supplied by Witco Corporation. The results of the test are shown in FIG. 6 where trace 174 is the untreated soil, trace 176 is soil washed only with water, and the cross hatched area 178 shows the results of soil washed with the surfactant solution. As can be seen, only soil treated in accordance with the invention met the clean soil limit of 25 ppm shown by the dashed line, and virtually all of the soil was recovered by this process.

EXAMPLE 4

Sewer sediment having the following initial contaminant levels:

| Uranium | 140 to 200 ppm |
|---|---|
| Mercury | 900 to 1000 ppm |
| PCBs | 5 to 10 ppm | the remediation requirements were:

| Uranium | 50 ppm |
|---|---|
| Mercury | 12 ppm |
| PCB | 2 ppm |
| Pass TCLP | |

Figure 7:
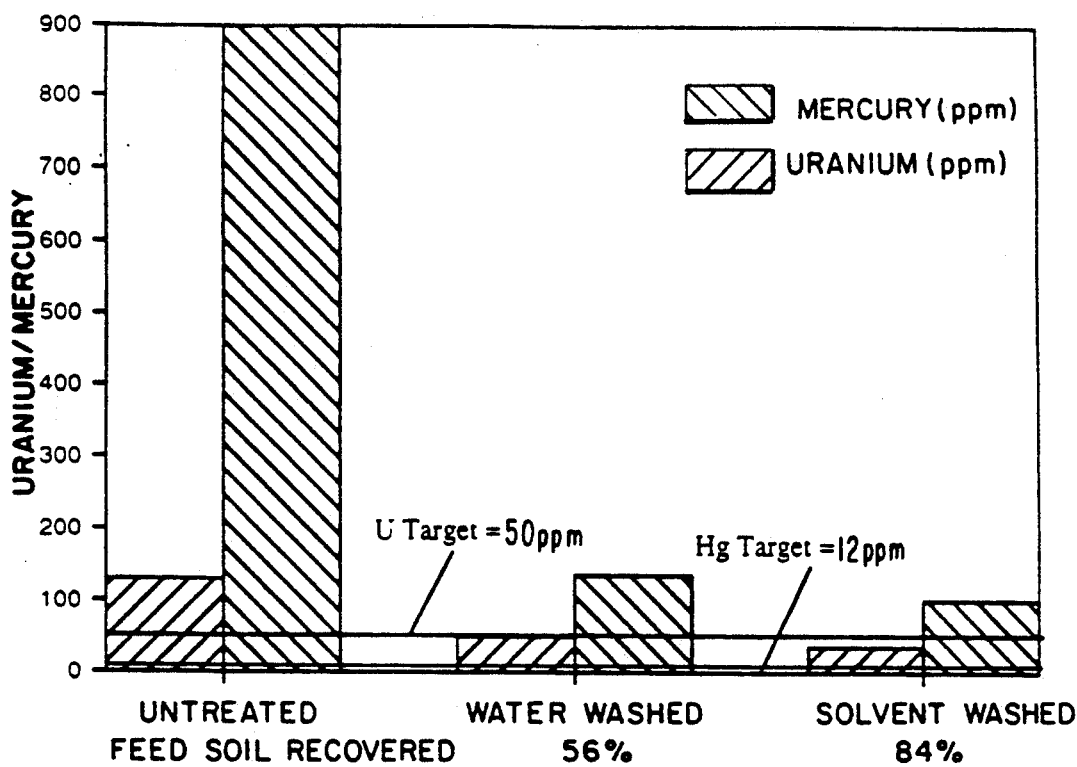
FIGS. 7 and 8 are bar graphs illustrating the results of two examples of cleaning soil in accordance with the embodiment of the invention illustrated in FIG. 3.

The sewer sediment was treated by attrition scrubbing and initial fines separation using a sodium hypochloride solution (20 g/l), washing with water and density separation using the embodiment of the invention illustrated in FIG. 3. The results of the test are shown in the bar chart of FIG. 7. The uranium target of 50 ppm was easily met using the invention. The chemical limit of 12 ppm of mercury was not met. However, this limit was arbitrarily set on the assumption that the mercury contamination was in the form of elemental mercury. In fact, the mercury was in the form of an intermetalic amalgam of uranium and mercury which is highly insoluble. As a result, the mercury level achieved passed the TCLP.

EXAMPLE 5

Oil land farm soil with the following initial contamination levels:

| Uranium | 120 ppm |
|---|---|
| PCB | 7 to 14 ppm |
| Oil/Grease | 3 to 6 wt. % | was treated according to the embodiment of the invention shown in FIG. 3. The remediation requirements were as follows:

| Uranium | 80 ppm |
|---|---|
| PCB | 2 ppm |
| Pass TCLP Test | |

The contaminant mobilizing solution was a surfactant mixture of 0.1 wt. % APG—325 available from Henkel Corporation and 0.1 wt. % ASO available from Witco Corporation. This surfactant mixture was mixed with a leaching solution containing sodium hypochloride (20 g/l) and sodium carbonate (21 g/l).

The results of this example for virtually 100% recovered soil were:

| | |
|---|---|
| Uranium | 60 ppm |
| PCB | <2 ppm |
| Passed TCLP | |

Figure 8:
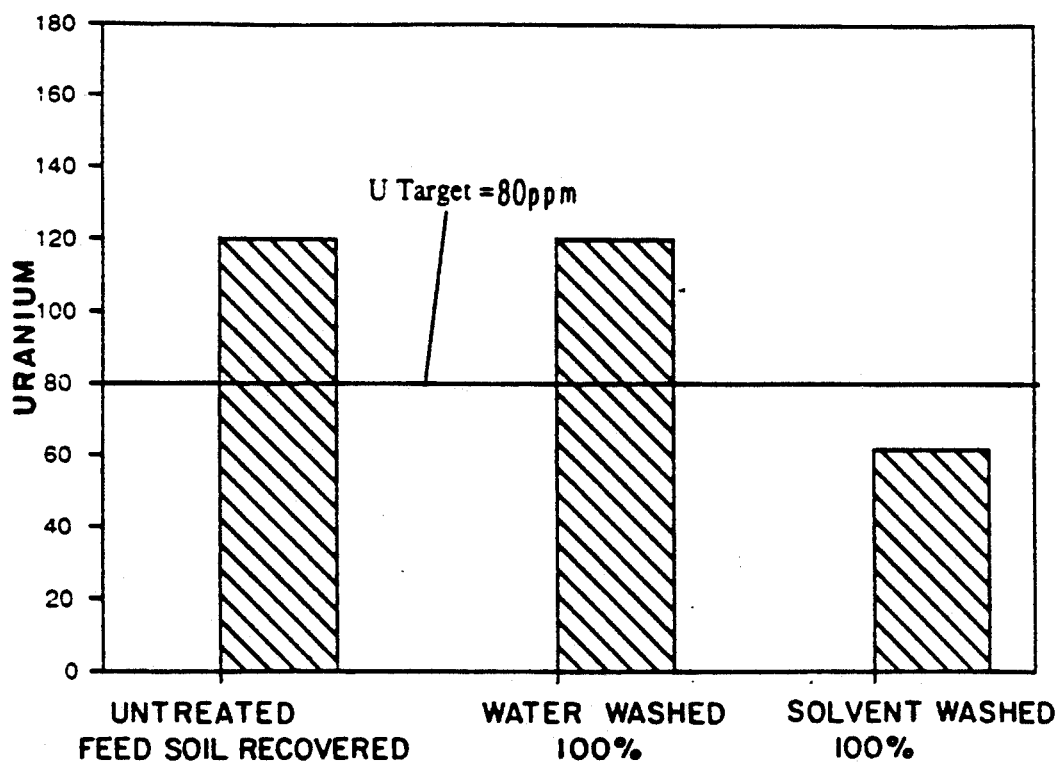

The uranium levels for untreated soil, water washed soil and soil treated in accordance with the invention are shown in FIG. 8.

From the above, it can be seen that the invention provides a versatile method and apparatus for treating various types of particulate materials contaminated with various substances.

While specific embodiments cf the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope cf the invention which is to be given the full breadth of the appended claims and any and all equivalents thereof.

What is claimed is:

1. A method for removing contaminants comprising heavy metals and radioactive compounds, singly and in combination, from a process stream used in removing said contaminants from contaminated particulate material, said method including the steps of:
    washing said contaminated particulate material with said process stream, thereby removing said contaminants from said particulate material, said process stream containing an oxidizing agent selected from the group $Cl_2$, $ClO_2$ and $O_3$ and/or a reducing agent, said oxidizing or reducing agent rendering at least one of said contaminants more soluble in said process stream;
    separating clean particulate material from said process stream;
    treating said process stream with a precipitant to remove said contaminant rendered more soluble in said process stream by said oxidizing or reducing agent; and
    recycling said process stream for washing additional contaminated particulate material.

2. The method of claim 1 wherein said heavy metals are selected from the group Hg, U, Pb, Ag, As, Cd, Cr, Cu, Ra, Th.

3. The method of claim 1 wherein said process stream is water-based.

4. The method of claim 3 wherein said process stream further includes a leachate for the removal of said contaminants from said particulate matter.

5. The method of claim 3 wherein said process stream further includes a surfactant for the removal of said contaminants from said particulate matter.

6. The method of claim 5 wherein said surfactants are removed from said process stream following washing of said particulate matter.

7. The method of claim 6 wherein said surfactants are precipitated from said process stream.

8. The method of claim 7 wherein $CaCl_2$ is used for precipitating said surfactants.

9. The method of claim 8 wherein said contaminant rendered more soluble comprises said heavy metals.

10. The method of claim 8 wherein following removal of said clean particulate matter, said heavy metals are precipitated from said process stream with a precipitant.

11. The method of claim 10 wherein said precipitant comprises $Na_2SiO_3$.

12. The method of claim 11 wherein fines are recovered from said process stream prior to precipitation of said heavy metals.

13. The method of claim 12 wherein following removal of said fines said process stream is pH adjusted to about 8–10 to assist in precipitation and removal of said heavy metals from said process stream.

14. The method of claim 13 wherein said precipitated heavy metals are used as a feedstock for mining or smelting operations to recover said heavy metals.

15. The method of claim 13 wherein said precipitated heavy metals are mixed with a fixative material for disposal.

16. The method of claim 11 wherein fines are recovered with said precipitated heavy metals.

17. The method of claim 16 wherein said process stream is pH adjusted to 8–10 to assist in precipitation of said heavy metals.

18. The method of claim 17 wherein said precipitated heavy metals are used as a feedstock for mining or smelting operations to recover said heavy metals.

19. The method of claim 17 wherein said precipitated heavy metals and fines are mixed with a fixative material for disposal.

20. The method of claim 8 wherein said heavy metals are precipitated and removed from said process stream and said process stream is recycled for washing said particulate matter.

21. The method of claim 8 wherein additional oxidizing or reducing agent is added to said process stream following removal of said heavy metals.

22. The method of claim 21 wherein said contaminated particulate material further includes contaminants that are organic compounds and said additional oxidizing or reducing agent destroys said organic compounds.

23. The method of claim 22 wherein said process stream includes an aliphatic surfactant which is recycled for washing said contaminated particulate matter.

24. The method of claim 22 wherein said surfactants are removed from said process stream prior to treating said stream with a heavy metal precipitant and said surfactants are aliphatic when a reducing agent is used and are non-aliphatic when an oxidizing agent is used.

25. The method of claim 1 wherein said reducing agent is $H_2$ and said oxidizing agent is $Cl_2$.

26. The method of claim 1 wherein prior to treating said process stream with said precipitant fines are removed from said process stream.

27. A method for removing contaminants comprising heavy metals, radioactive compounds and organic compounds, singly and in combination, from a water-based process stream used in removing said contaminants from contaminated particulate material, said process stream containing a leachate and/or a surfactant, said process stream further including an oxidizing and/or a reducing agent, said oxidizing agent increasing the solubility of said heavy metal in said process stream, said method including the steps of:

washing said contaminated particulate material with said process stream, thereby removing said contaminates from said particulate material;

separating clean particulate material from said process stream, while retaining said heavy metals in solution in said process stream;

adjusting the pH of said process stream to 8-10;

adding a precipitant to precipitate said heavy metals from said process stream;

removing said heavy metals from said process stream; and recycling said leachate and/or said surfactant for washing additional contaminated particulate matter.

28. The method of claim 27 wherein said reducing agent is $H_2$ and said oxidizing agent is $Cl_2$.

29. The method of claim 27 wherein said heavy metals are selected from the group Hg, U, Pb, Ag, As, Cd, Cr, Cu, Ra, Th.

30. The method of claim 27 wherein said precipitant comprises $Na_2SiO_3$.

31. The method of claim 27 wherein said oxidizing agent comprises $Cl_2$, fines are removed from said process stream prior to precipitation of said heavy metals and prior to adjusting said pH, said precipitated heavy metals are removed from said process stream yielding a recycle process stream, and makeup $Cl_2$ is added to said recycle process stream, which is recycled for washing said contaminated particulate material.

32. The method of claim 27 wherein said oxidizing agent comprises $Cl_2$, said precipitant flocculates any metal hydroxides and fines, precipitated heavy metals, flocculated metal hydroxides and fines are removed from the process stream, yielding a recycle stream, and makeup $Cl_2$ is added to said recycle process stream, which is recycled for washing said contaminated particulate material.

33. The method of claim 27 wherein said oxidizing agent is used and comprises $Cl_2$, and organic contaminants are precipitated with $CaCl_2$ prior to precipitation of said heavy metals, and said precipitated heavy metals, organics and fines are removed from the process stream, yielding a recycle process stream, which is recycled for washing said contaminated particulate material.

34. The method of claim 27 wherein said oxidizing agent comprises $Cl_2$ and, wherein prior to adding said heavy metal precipitant, organic contaminants are precipitated with $CaCl_2$ and said precipitated organic contaminants and fines are removed, after which said heavy metal precipitant is added, said heavy metals are precipitated and removed from said process stream, yielding a recycle process stream, which is recycled for washing said contaminated particulate matter.

35. An apparatus for removing contaminants comprising heavy metals, organics and radioactive compounds, singly and in combination, from a process stream used in removing said contaminants from contaminated particulate material, said apparatus comprising:

means washing said contaminated particulate material with said process stream, thereby removing said contaminates from said particulate material;

means introducing an oxidizing and/or reducing agent to said process stream, said oxidizing agent increasing the solubility of said heavy metals in said process stream;

means separating clean particulate material from said process stream following removal of said contaminants from said particulate material by said process stream;

means treating said process stream with a heavy metal precipitant following removal of said clean particulate material therefrom;

means removing precipitated heavy metal from said process stream following precipitation of said heavy metal;

means treating said process stream after removal of said heavy metal therefrom with makeup oxidizing and/or reducing agent;

means recycling said process stream to said means washing said contaminated particulate material.

* * * * *